(12) United States Patent
He et al.

(10) Patent No.: US 12,378,355 B2
(45) Date of Patent: Aug. 5, 2025

(54) ISOPOLY-MOLYBDIC ACID COORDINATION POLYMER FOR CATALYZING RING-OPENING POLYMERIZATION OF LACTIDE AND METHOD OF MANUFACTURING THE SAME

(71) Applicant: Changzhou University, Changzhou (CN)

(72) Inventors: Mingyang He, Changzhou (CN); Qun Chen, Changzhou (CN); Junfeng Qian, Changzhou (CN); Yuyang Zhu, Changzhou (CN); Shengchun Chen, Changzhou (CN); Meijun Wei, Changzhou (CN)

(73) Assignee: Changzhou University, Changzhou (CN)

( * ) Notice: Subject to any disclaimer, the term of this patent is extended or adjusted under 35 U.S.C. 154(b) by 602 days.

(21) Appl. No.: 17/875,391

(22) Filed: Jul. 27, 2022

(65) Prior Publication Data

US 2023/0167237 A1 Jun. 1, 2023

(30) Foreign Application Priority Data

Nov. 30, 2021 (CN) .......................... 202111443269.3

(51) Int. Cl.
*C08G 63/82* (2006.01)
(52) U.S. Cl.
CPC ................... *C08G 63/823* (2013.01)

(58) Field of Classification Search
CPC .................................................... C08G 63/823
(Continued)

(56) References Cited

PUBLICATIONS

Antunes et al., "A Linear Trinuclear Oxidodiperoxido-molybdenum(VI) Complex with Single Triazole Bridges: Catalytic Activity in Epoxidation, Alcoholysis, and Acetalization Reactions", ChemCatChem, 2018, vol. 10, p. 2782-2791. (Year: 2018).*

(Continued)

*Primary Examiner* — David T Karst
(74) *Attorney, Agent, or Firm* — IDEA Intellectual Limited; Sam T. Yip (57) ABSTRACT

An isopoly-molybdic acid coordination polymer and a method of manufacturing the same are provided. It relates to the field of catalysts for polylactic acid. A chemical formula of the isopoly-molybdic acid coordination polymer is $[Mo_2O_4(\mu_2\text{-}OH)_2(Htrz)]$. Htrz is a 1,2,4-triazole ligand, and $(Mo_2O_4)^{2+}$ is a binuclear isopoly-molybdic radical cation. $(\mu_2\text{-}OH)$ is the bridging hydroxyl group. Sodium molybdate dihydrate and zinc nitrate hexahydrate undergo hydrothermal reaction in a closed condition to obtain an isopoly-molybdic acid coordination polymer that has a secondary layered structure. The synthesis of the isopoly-molybdic acid coordination polymer is simple with high yield and reproducibility. The isopoly-molybdic acid coordination polymer shows high catalytic activity towards the bulk ring-opening polymerization of lactide. The resulting polylactic acid has a weight average molecular weight exceeding 110,000. The polylactic acid has great potential in the fields of medical, degradable and packaging materials.

10 Claims, 3 Drawing Sheets

(58) Field of Classification Search
USPC .......................................................... 528/277
See application file for complete search history.

(56) References Cited

PUBLICATIONS

Neves et al., "Behavior of Triazolylmolybdenum(VI) Oxide Hybrids as Oxidation Catalysts with Hydrogen Peroxide", Catalysis Letters, 2017, vol. 147, p. 1133-1143. (Year: 2017).*

Amarante et al., "Metal oxide-triazole hybrids as heterogeneous or reaction-induced self-separating catalysts", Journal of Catalysis, 2016, vol. 340, pp. 354-367. (Year: 2016).*

Lysenko et al., "Synthesis and Structural Elucidation of Triazolylmolybdenum(VI) Oxide Hybrids and Their Behavior as Oxidation Catalysts", Inorganic Chemistry, 2015, vol. 54, pp. 8327-8338. (Year: 2015).*

Abdel Fattah T. M., Pinnavaia T. J., Tin-substituted mesoporous silica molecular sieve (Sn-HMS): synthesis and properties as a heterogeneous catalyst for lactide ring-opening polymerization, Chem. Commun. 1996, (5), 665-666.

Yu K., Jones C. W., Elucidating the role of silica surfaces in the ring-opening polymerization of lactide: catalytic behavior of silica-immobilized zinc β-diiminate complexes, J. Catal. 2004, 222, 558-564.

Wanna N., Kraithong T., Khamnaen T., Phiriyawirut P., Charoenchaidet S., Tantirungrotechai J. , Aluminum- and calcium-incorporated MCM-41-type silica as supports for the immobilization of titanium(IV) isopropoxide in ring-opening polymerization of l-lactide and E-caprolactone, Catal. Commun. 2014, 45, 118-123.

* cited by examiner

ISOPOLY-MOLYBDIC ACID COORDINATION POLYMER FOR CATALYZING RING-OPENING POLYMERIZATION OF LACTIDE AND METHOD OF MANUFACTURING THE SAME

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE OF RELATED APPLICATION

This application is claiming priority from a Chinese patent application number 202111443269.3 filed on Nov. 30, 2021, the disclosure of which are incorporated herein by reference in their entirety.

FIELD OF THE INVENTION

The invention relates to the technical field of catalysts for polylactic acid. In particular, it relates to an isopoly-molybdic acid coordination polymer for catalyzing the ring-opening polymerization of lactide and a method of manufacturing the same.

BACKGROUND OF THE INVENTION

Polylactic acid (PLA) is a polyester polymer synthesized by lactic acid as the main ingredient. PLA is non-toxic and has good biocompatibility and bio-absorbability. Because PLA can be completely degraded into water and carbon dioxide in living organisms, it is safe and therefore recognized as an ideal green polymer material. Moreover, PLA has been approved by the USFDA as one of a handful of biodegradable polymer scaffold materials. PLA has since then been widely used in medical fields as osteogenic or chondrogenic scaffolds and jointing materials, skin wound dressings, medical wound sutures, and drug slow-release and controlled-release carriers.

There are currently two approaches to synthesize PLA: direct polycondensation of lactic acid and ring-opening polymerization of lactide. Direct polycondensation is a simple, low-cost process. However, the resulting product has a lower molecular weight and purity, with a light yellow or yellowish-brown tinge. This variety of PLA has a narrower range of applications.

PLA with a higher molecular weight (more than 80,000) is usually obtained by ring-opening polymerization of lactide under the catalysis of homogeneous organometallic compounds. Stannous octanoate is the most widely used catalyst, but the metal residues of many organometallic compounds, including stannous octanoate, have adverse effects on the quality and usability of any PLA that is formed. In the ring-opening polymerization of lactide, utilizing a heterogeneous catalyst with high activity is a very good solution. However, most of the literature has focused on the heterogeneous catalyst of organometallic compounds loaded on silica (Abdel Fattah T. M., Pinnavaia T. J. Chem. Commun. 1996, (5), 665-666; Yu K., Jones C. W. J. Catal. 2004, 222, 558-564; Wanna N., Kraithong T., Khamnaen T., Phiriyawirut P., Charoenchaidet S., Tantirungrotechai J. Catal. Commun. 2014, 45, 118-123). The research on poly-acid coordination polymers in the ring-opening polymerization of lactide has not been as widely reported.

SUMMARY OF THE INVENTION

This section is for the purpose of summarizing some aspects of embodiments of the invention and to briefly introduce some further embodiments. In this section, as well as in the abstract and the title of the invention of this application, simplifications or omissions may be made to avoid obscuring the purpose of the section, the abstract and the title, and such simplifications or omissions are not intended to limit the scope of the invention.

The present invention has been made in view of the above-mentioned problems.

Accordingly, one aspect of the present invention provides an isopoly-molybdic acid coordination polymer and method of manufacturing the same.

In one embodiment of the present invention, an isopoly-molybdic acid coordination polymer catalyst for catalyzing a ring-opening polymerization of lactide is provided. The isopoly-molybdic acid coordination polymer catalyst has a chemical formula of $[Mo_2O_4(\mu_2\text{-}OH)_2(Htrz)]$, Htrz is a 1,2,4-triazole ligand, $(Mo_2O_4)^{2+}$ is a binuclear isopoly-molybdate cation, and $(\mu_2\text{-}OH)$ is a bridging hydroxyl group.

In a further embodiment of the present invention, the isopoly-molybdic acid coordination polymer catalyst comprises a secondary structural unit, the secondary structural unit is an orthorhombic system in the crystal structure and Pbcm in space group, the secondary structural unit has a molecular formula of $C_2H_5Mo_2N_3O_6$ and molecular weight of 358.99, the cell parameters of the secondary structural unit are a=3.9325(7) Å, b=13.844(3)Å, c=13.360(2) Å, $\alpha=90°$, $\beta=90°$, $\gamma=90°$, the cell volume is 727.3(2) Å$^3$, z=4, and a basic structure of the secondary structural unit is a two-dimensional layered structure coordinated by $[Mo_2O_4]^{2+}$, 1,2,4-triazole ligand and $(\mu_2\text{-}OH)$.

Another aspect of the present invention provides a method of manufacturing the isopoly-molybdic acid coordination polymer catalyst for catalyzing a ring-opening polymerization of lactide.

In a further embodiment of the present invention, the method of manufacturing the isopoly-molybdic acid coordination polymer catalyst for catalyzing a ring-opening polymerization of lactide includes adding a composition of sodium molybdate dihydrate, 1,2,4-triazole, zinc nitrate hexahydrate and deionized water to an autoclave and effecting a reaction in the composition at a temperature between 160 and 190° C. for a period between 48 and 96 hours. The composition is cooled to room temperature to obtain a crystal of the isopoly-molybdic acid coordination polymer. The crystal of the isopoly-molybdic acid coordination polymer is rinsed by deionized water and then ethanol. The crystal of the isopoly-molybdic acid coordination polymer is dried to obtain the isopoly-molybdic acid coordination polymer.

In a further embodiment of the present invention, the mass ratio between the zinc nitrate hexahydrate and the sodium molybdate dihydrate is between 1:1 and 1:5.

In a further embodiment of the present invention, the mass ratio between the zinc nitrate hexahydrate and the 1,2,4-triazole is between 1:4 and 1:8.

In a further embodiment of the present invention, the mass ratio between sodium molybdate dihydrate and 1,2,4-triazole is between 1:1 and 1:5.

In a further embodiment of the present invention, every 3 to 9 ml of water is added to every 0.6 mmol of 1,2,4-triazole.

Still another aspect of the present invention provides an application of the isopoly-molybdic acid coordination polymer in catalyzing the ring-opening polymerization of lactide to form the polylactic acid. The application includes adding isopoly-molybdic acid coordination polymer catalyst and lactide into a dry Schlenk reaction tube to effect a bulk ring-opening polymerization under a reaction temperature and obtain polylactic acid. The reaction temperature ranges between 150 and 190° C., and the reaction time ranges between 6 and 24 hours.

In a further embodiment of the present invention, the molar ratio between the isopoly-molybdic acid coordination polymer and lactide is between 1:5,000 and 1:30,000.

In a further embodiment of the present invention, the weight average molecular weight of polylactic acid is between 70,000 and 120,000, and the molecular weight distribution index is between 1.3 and 1.8.

The advantages provided by the present invention:

An isopoly-molybdic acid coordination polymer and method of manufacturing the same are provided. The synthesis of the isopoly-molybdic acid coordination polymer is simple with high yield and reproducibility. The isopoly-molybdic acid coordination polymer shows high catalytic activity towards the bulk ring-opening polymerization of lactide. The resulting polylactic acid has a weight average molecular weight exceeding 70,000. The polylactic acid has great potential in the fields of medical, degradable and packaging materials.

BRIEF DESCRIPTION OF THE DRAWINGS

In order to more clearly illustrate the technical solutions of the embodiments of the present invention, the drawings needed to be used in the description of the embodiments will be briefly introduced below. It is obvious that the drawings in the following description are only some embodiments of the present invention, and it is obvious for those skilled in the art to obtain other drawings based on these drawings without inventive exercise, in which.

DETAILED DESCRIPTION

In order to make the aforementioned objects, features and advantages of the present invention comprehensible, embodiments accompanied with figures are described in detail below.

In the following description, numerous specific details are set forth in order to provide a thorough understanding of the present invention, but the present invention may be practiced in other ways than those specifically described and will be readily apparent to those of ordinary skill in the art without departing from the spirit of the present invention, and therefore the present invention is not limited to the specific embodiments disclosed below.

Example 1

Manufacturing of isopoly-molybdic acid coordination polymer: Zinc nitrate hexahydrate (29.7 mg, 0.1 mmol), 1,2,4-triazole (41.4 mg, 0.6 mmol), sodium molybdate dihydrate (72.6 mg, 0.3 mmol) and deionized water (6 ml) are added to a 15 ml polytetrafluoroethylene autoclave. After the composition undergoes a reaction at 180° C. for 72 hours, it is slowly cooled to room temperature at a rate of 5° C./hour to obtain colorless block crystals with a yield of 47.4% (25.5 mg, based on Mo).

Infrared data (KBr, cm$^{-1}$) are 3565 s, 3376 b r, 2363 w, 1596 m, 1173 w, 1096 m, 918 s, 759 s w, 539 s.

Example 2

Zinc nitrate hexahydrate (59.4 mg, 0.2 mmol), 1,2,4-triazole (29.7 mg, 0.1 mmol), sodium molybdate dihydrate (72.6 mg, 0.3 mmol) and deionized water (12 ml) are added to a 15 ml polytetrafluoroethylene autoclave. After the composition undergoes a reaction at 180° C. for 72 hours, it is slowly cooled to room temperature at a rate of 5° C./hour to obtain colorless block crystals with a yield of 34.5% (19.4 mg, based on Mo).

Example 3

Zinc nitrate hexahydrate (14.85 mg, 0.05 mmol), 1,2,4-triazole (29.7 mg, 0.1 mmol), sodium molybdate dihydrate (72.6 mg, 0.3 mmol) and deionized water (6 ml) are added to a 15 ml polytetrafluoroethylene autoclave. After the composition undergoes a reaction at 190° C. for 72 hours, it is slowly cooled to room temperature at a rate of 5° C./hour to obtain colorless block crystals with a yield of 36.5% (19.8 mg, based on Mo).

Example 4

Zinc nitrate hexahydrate (29.7 mg, 0.1 mmol), 1,2,4-triazole (55.2 mg, 0.8 mmol), sodium molybdate dihydrate (72.6 mg, 0.3 mmol) and deionized water (12 ml) are added to a 15 ml polytetrafluoroethylene autoclave. After the composition undergoes a reaction at 180° C. for 72 hours, it is slowly cooled to room temperature at a rate of 5° C./hour to obtain colorless block crystals with a yield of 37% (20.1 mg, based on Mo).

Example 5

Zinc nitrate hexahydrate (29.7 mg, 0.1 mmol), 1,2,4-triazole (27.6 mg, 0.4 mmol), sodium molybdate dihydrate (72.6 mg, 0.3 mmol) and deionized water (12 ml) are added to a 15 ml polytetrafluoroethylene autoclave. After the composition undergoes a reaction at 180° C. for 72 hours, it is slowly cooled to room temperature at a rate of 5° C./hour to obtain colorless block crystals with a yield of 35.1% (18.9 mg, based on Mo).

Example 6

Manufacturing of isopoly-molybdic acid coordination polymer: Zinc nitrate hexahydrate (29.7 mg, 0.1 mmol), 1,2,4-triazole (41.4 mg, 0.6 mmol), sodium molybdate dihydrate (24.2 mg, 0.1 mmol) and deionized water (6 ml) are added to a 15 ml polytetrafluoroethylene autoclave. After the composition undergoes a reaction at 180° C. for 48 hours, it is slowly cooled to room temperature at a rate of 5° C./hour to obtain colorless block crystals with a yield of 28.9% (15.6 mg, based on Mo).

Example 7

Manufacturing of isopoly-molybdic acid coordination polymer: Zinc nitrate hexahydrate (29.7 mg, 0.1 mmol), 1,2,4-triazole (41.4 mg, 0.6 mmol), sodium molybdate dihydrate (121 mg, 0.5 mmol) and deionized water (3 ml) are added to a 15 ml polytetrafluoroethylene autoclave. After the composition undergoes a reaction at 180° C. for 72 hours, it is slowly cooled to room temperature at a rate of 5° C./hour to obtain colorless block crystals with a yield of 34.2% (18.4 mg, based on Mo).

Example 8

Zinc nitrate hexahydrate (29.7 mg, 0.1 mmol), 1,2,4-triazole (41.4 mg, 0.6 mmol), sodium molybdate dihydrate (72.6 mg, 0.3 mmol) and deionized water (12 ml) are added to a 15 ml polytetrafluoroethylene autoclave. After the composition undergoes a reaction at 160° C. for 72 hours, it is slowly cooled to room temperature at a rate of 5° C./hour to obtain colorless block crystals with a yield of 41.8% (22.1 mg, based on Mo).

Example 9

Zinc nitrate hexahydrate (29.7 mg, 0.1 mmol), 1,2,4-triazole (41.4 mg, 0.6 mmol), sodium molybdate dihydrate (72.6 mg, 0.3 mmol) and deionized water (3 ml) are added to a 15 ml polytetrafluoroethylene autoclave. After the composition undergoes a reaction at 190° C. for 72 hours, it is slowly cooled to room temperature at a rate of 5° C./hour to obtain colorless block crystals with a yield of 40.1% (21.6 mg, based on Mo).

Example 10

Zinc nitrate hexahydrate (29.7 mg, 0.1 mmol), 1,2,4-triazole (41.4 mg, 0.6 mmol), sodium molybdate dihydrate (72.6 mg, 0.3 mmol) and deionized water (12 ml) are added to a 15 ml polytetrafluoroethylene autoclave. After the composition undergoes a reaction at 190° C. for 72 hours, it is slowly cooled to room temperature at a rate of 5° C./hour to obtain colorless block crystals with a yield of 40.1% (21.6 mg, based on Mo).

Example 11

Zinc nitrate hexahydrate (29.7 mg, 0.1 mmol), 1,2,4-triazole (29.7 mg, 0.1 mmol), sodium molybdate dihydrate (72.6 mg, 0.3 mmol) and deionized water (6 ml) are added to a 15 ml polytetrafluoroethylene autoclave. After the composition undergoes a reaction at 160° C. for 72 hours, it is slowly cooled to room temperature at a rate of 5° C./hour to obtain colorless block crystals with a yield of 37.7% (20.3 mg, based on Mo).

Example 12

Zinc nitrate hexahydrate (29.7 mg, 0.1 mmol), 1,2,4-triazole (55.2 mg, 0.8 mmol), sodium molybdate dihydrate (72.6 mg, 0.3 mmol) and deionized water (6 ml) are added to a 15 ml polytetrafluoroethylene autoclave. After the composition undergoes a reaction at 180° C. for 96 hours, it is slowly cooled to room temperature at a rate of 5° C./hour to obtain colorless block crystals with a yield of 42.6% (22.9 mg, based on Mo).

Example 13

Zinc nitrate hexahydrate (29.7 mg, 0.1 mmol), 1,2,4-triazole (41.4 mg, 0.6 mmol), sodium molybdate dihydrate (72.6 mg, 0.3 mmol) and deionized water (3 ml) are added to a 15 ml polytetrafluoroethylene autoclave. After the composition undergoes a reaction at 180° C. for 48 hours, it is slowly cooled to room temperature at a rate of 5° C./hour to obtain colorless block crystals with a yield of 41.7% (22.4 mg, based on Mo).

Comparative Example 1

Zinc nitrate hexahydrate is replaced with other zinc salts (such as zinc acetate, zinc chloride or zinc sulfate) or other metal salts (such as copper nitrate, silver nitrate, cobalt nitrate, iron nitrate, calcium nitrate, magnesium nitrate, aluminum nitrate or lanthanum nitrate, 0.1 mmol). The other zinc salts/metal salts, 1,2,4-triazole (41.4 mg, 0.6 mmol), sodium molybdate dihydrate (72.6 mg, 0.3 mmol) and deionized water (6 ml) are added to a 15 ml polytetrafluoroethylene autoclave. After the composition undergoes a reaction at 160° C. for 72 hours, it is slowly cooled to room temperature at a rate of 5° C./hour. There is no crystal sample suitable for X-ray single crystal analysis. The products are amorphous powders with undefined structure.

Comparative Example 2

Sodium molybdate dihydrate is replaced with other molybdate (ammonium molybdate tetrahydrate or phosphomolybdic acid, 0.3 mmol). The other molybdate, 1,2,4-triazole (41.4 mg, 0.6 mmol), sodium molybdate dihydrate (72.6 mg, 0.3 mmol) and deionized water (6 ml) are added to a 15 ml polytetrafluoroethylene autoclave. After the composition undergoes a reaction at 180° C. for 72 hours, it is slowly cooled to room temperature at a rate of 5° C./hour. There is no crystal sample suitable for X-ray single crystal analysis. The products are amorphous powders with undefined structure.

Comparative Example 3

1,2,4-triazole is replaced by other nitrogen heterocyclic ligands (1-methyl-1,2,4-triazole, 4-amino-1,2,4-triazole, benzimidazole or 2-methylimidazole, 0.6 mmol). The other nitrogen heterocyclic ligans, 1,2,4-triazole (41.4 mg, 0.6 mmol), sodium molybdate dihydrate (72.6 mg, 0.3 mmol) and deionized water (6 ml) are added to a 15 ml polytetrafluoroethylene autoclave. After the composition undergoes a reaction at 180° C. for 72 hours, it is slowly cooled to room temperature at a rate of 5° C./hour. There is no crystal sample suitable for X-ray single crystal analysis. The products are amorphous powders with undefined structure.

Example 14

The isopoly-molybdic acid coordination polymer catalyst prepared in Example 1 is characterized as follows.

(1) Crystal Structure Determination of Isopoly-Molybdic Coordination Polymer The crystal structure is determined by Bruker Apex II CCD diffractometer with graphite monochromated Mo Kα ray (λ=0.71073 Å) at 293(2)K by ω scanning to collect the diffraction points. The collected data are restored by a SAINT program, and semi empirical absorption correction is performed by SADABS method. The structure analysis and refinement are completed by SHELLXS and SHELLXL of SHELLXTL program respectively. $F^2$ is modified by a full matrix least square method to obtain the coordinates and anisotropy parameters of all non-hydrogen atoms. All hydrogen atoms are theoretically fixed to the parent atom in the process of structural refinement, and the isotropic displacement parameter is slightly larger than the parent atom displacement parameter (C—H, 1.2, N—H, or O—H 1.5 times). Table 1 shows detailed crystal measurement data.

TABLE 1

Crystallographic data of isopoly-molybdic acid coordination polymer

| | |
|---|---|
| Molecular formula | $C_2H_5Mo_2N_3O_6$ |
| Molecular weight | 358.99 |
| Crystal size | 0.20 mm × 0.18 mm × 0.18 mm |
| Crystallographic system | orthogonal |
| Space group | Pbcm |
| Cell parameters | a = 3.9325(7) Å |
| | b = 13.844(3) Å |
| | c = 13.360(2) Å |
| | α = 90° |
| | β = 90° |
| | γ = 90° |
| Volume | 727.3(2) Å$^3$ |
| Number of repeating units in cell | 4 |
| Density (calculated) | 3.297 mg m$^{-3}$ |
| Absorption coefficient | 3.454 |
| Absorption correction | Semi-empirical |
| Refinement | Least square |
| $F^2$ base fit | 1.012 |
| Final R factor [I > 2σ(I)] | $R_1$ = 0.0244 |
| R factor (all data) | $R_1$ = 0.0253 |
| Residual error | 0.910 eÅ$^{-3}$, −1.618 eÅ$^{-3}$ |

Figure 1:
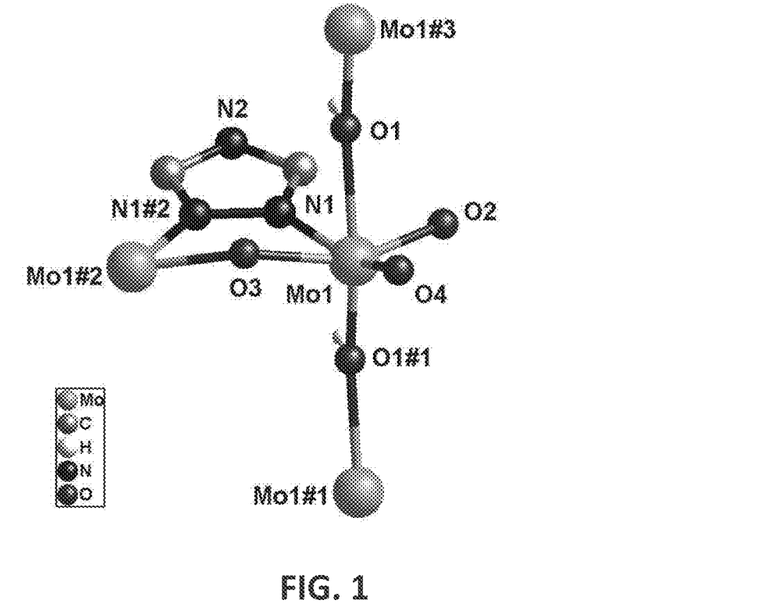
FIG. 1 shows the coordination environment of the molybdate radicals in an isopoly-molybdic acid coordination polymer according to an embodiment of the present invention.
Figure 2:
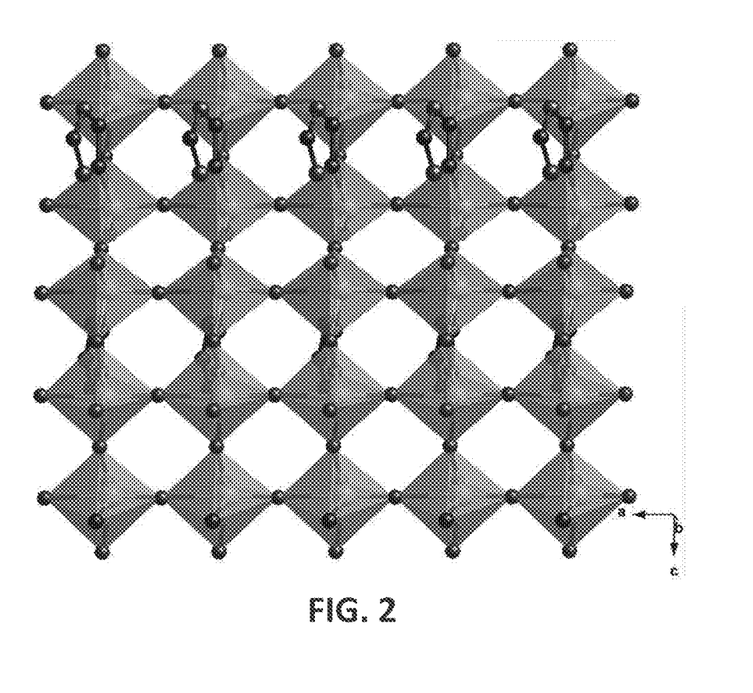
FIG. 2 is a two-dimensional layered structure diagram showing an isopoly-molybdic acid coordination polymer according to an embodiment of the present invention.

FIG. 1 shows the coordination environment of the molybdate radicals. FIG. 2 shows a two-dimensional layered structure. FIG. 1 shows the coordination environment of the molybdate radicals in an isopoly-molybdic acid coordination polymer. FIG. 2 shows a two-dimensional layered structure diagram of an isopoly-molybdic acid coordination polymer.

Figure 3:
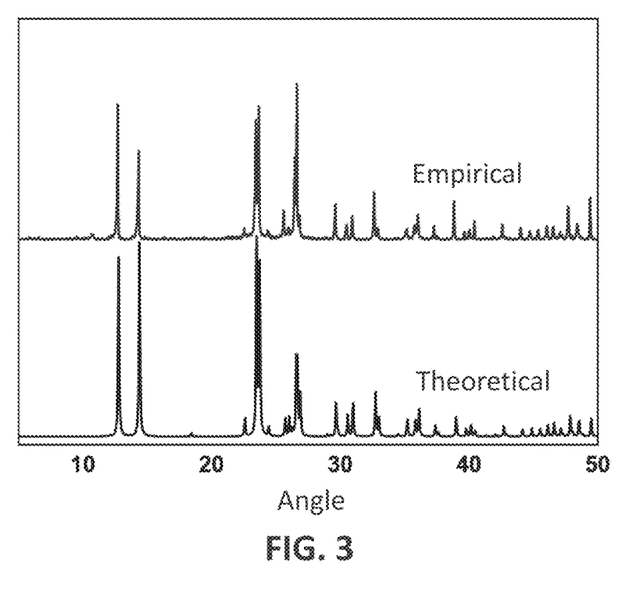
FIG. 3 is a powder diffraction diagram of an isopoly-molybdic acid coordination polymer according to an embodiment of the present invention.

(2) Characterization of Phase Purity of Isopoly-Molybdic Acid Coordination Polymer Turning to FIG. 3, the powder diffraction diagram of the isopoly-molybdic acid coordination polymer shows that it has a reliable phase purity, which ensures its catalytic activity in the ring-opening polymerization of lactide. (A RIGAKU d/max-2500 instrument is used.)

Figure 4:
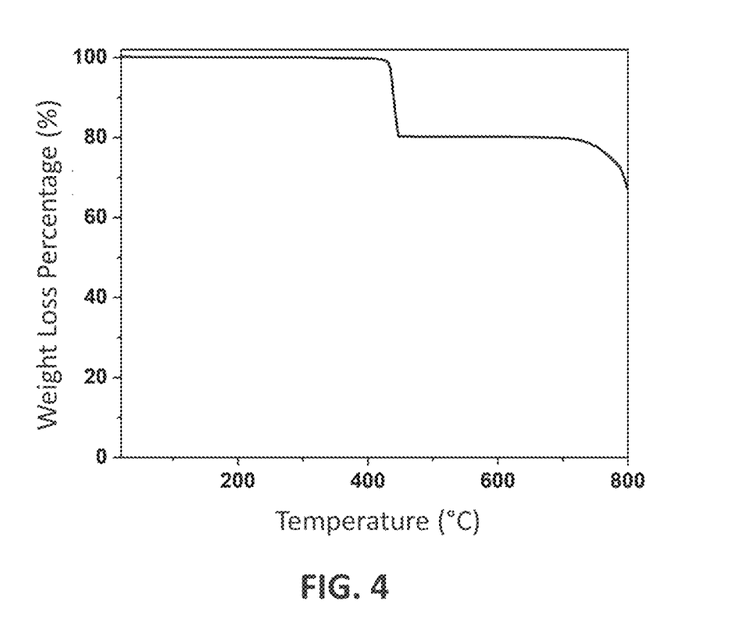
FIG. 4 is a thermogravimetric diagram of an isopoly-molybdic acid coordination polymer according to an embodiment of the present invention.

(3) Characterization of Heat Stability of Isopoly-Molybdic Acid Coordination Polymer The thermal stability of the isopoly-molybdic acid coordination polymer can be characterized by a thermogravimetric analyzer. FIG. 4 shows the thermogravimetric diagram of the organic frame material having cobalt containing isopoly-molybdic acid metal. The results show isopoly-molybdic acid coordination polymer (instrument model: NETZSCH/TG 209 F3).

Example 15

Using the Isopoly-Molybdic Acid Metal Organic Frame Material of Example 1 to Catalyze Lactide for the Manufacturing of PLA 25.9 g lactide (0.18 mol) and 4.31 mg isopoly-molybdic acid coordination polymer (0.012 mmol) are added to Schlenk reaction tubes. The tubes are heated to 160° C. for 18 hours. After the polymerization is completed, the product is cooled to room temperature. The product is dissolved in 30 ml dichloromethane. The isopoly-molybdic acid coordination polymer is recovered by centrifugation. Then, 360 ml of methanol is added to the filtrate to precipitate the polymer. The polymer is dried in a vacuum at 50° C. to obtain the white PLA product.

Figure 5:
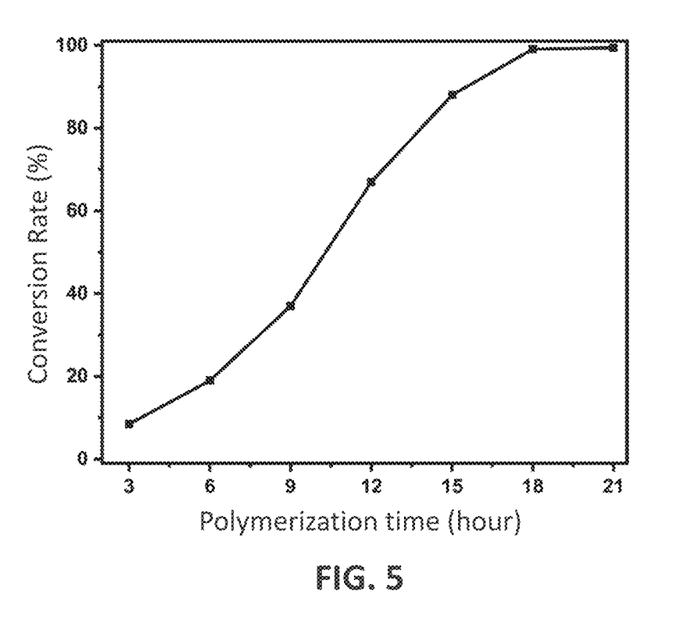
FIG. 5 is a graph showing the conversion rate and reaction time of a bulk ring-opening polymerization of lactide catalyzed by an isopoly-molybdic acid coordination polymer according to an embodiment of the present invention.

The relationship between the conversion rate and the reaction time is determined by $^1$H NMR quantitative analysis, as shown in FIG. 5. FIG. 5 shows a graph of the conversion rate and reaction time of the organic frame material having copper containing isopoly-molybdic acid metal to catalyze the ring-opening polymerization of lactide (instrument model: Bruker AVANCE 400 MHz).

Example 16

25.9 g lactide (0.18 mol) and 12.93 mg isopoly-molybdic acid coordination polymer (0.036 mmol) are added to Schlenk reaction tubes. The tubes are heated to 160° C. for 24 hours. After the polymerization is completed, the product is cooled to room temperature. The product is dissolved in 30 ml dichloromethane. The isopoly-molybdic acid coordination polymer is recovered by centrifugation. Then, 360 ml of methanol is added to the filtrate to precipitate the polymer. The polymer is dried in a vacuum at 50° C. to obtain the white PLA product.

Example 17

25.9 g lactide (0.18 mol) and 2.155 mg isopoly-molybdic acid coordination polymer (0.006 mmol) are added to Schlenk reaction tubes. The tubes are heated to 190° C. for 18 hours. After the polymerization is completed, the product is cooled to room temperature. The product is dissolved in 30 ml dichloromethane. The isopoly-molybdic acid coordination polymer is recovered by centrifugation. Then, 360 ml of methanol is added to the filtrate to precipitate the polymer. The polymer is dried in a vacuum at 50° C. to obtain the white PLA product.

Example 18

25.9 g lactide (0.18 mol) and 4.31 mg isopoly-molybdic acid coordination polymer (0.012 mmol) are added to Schlenk reaction tubes. The tubes are heated to 190° C. for 24 hours. After the polymerization is completed, the product is cooled to room temperature. The product is dissolved in 30 ml dichloromethane. The isopoly-molybdic acid coordination polymer is recovered by centrifugation. Then, 360 ml of methanol is added to the filtrate to precipitate the polymer. The polymer is dried in a vacuum at 50° C. to obtain the white PLA product.

Example 19

25.9 g lactide (0.18 mol) and 4.31 mg isopoly-molybdic acid coordination polymer (0.012 mmol) are added to Schlenk reaction tubes. The tubes are heated to 160° C. for 6 hours. After the polymerization is completed, the product is cooled to room temperature. The product is dissolved in 30 ml dichloromethane. The isopoly-molybdic acid coordination polymer is recovered by centrifugation. Then, 360 ml of methanol is added to the filtrate to precipitate the polymer. The polymer is dried in a vacuum at 50° C. to obtain the white PLA product.

Example 20

25.9 g lactide (0.18 mol) and 2.155 mg isopoly-molybdic acid coordination polymer (0.006 mmol) are added to Schlenk reaction tubes. The tubes are heated to 150° C. for 18 hours. After the polymerization is completed, the product is cooled to room temperature. The product is dissolved in 30 ml dichloromethane. The isopoly-molybdic acid coordination polymer is recovered by centrifugation. Then, 360 ml of methanol is added to the filtrate to precipitate the polymer. The polymer is dried in a vacuum at 50° C. to obtain the white PLA product.

Example 21

25.9 g lactide (0.18 mol) and 12.93 mg isopoly-molybdic acid coordination polymer (0.036 mmol) are added to Schlenk reaction tubes. The tubes are heated to 190° C. for 18 hours. After the polymerization is completed, the product is cooled to room temperature. The product is dissolved in 30 ml dichloromethane. The isopoly-molybdic acid coordination polymer is recovered by centrifugation. Then, 360 ml of methanol is added to the filtrate to precipitate the polymer. The polymer is dried in a vacuum at 50° C. to obtain the white PLA product.

Example 22

(1) Measurement of the Molecular Weight of Example 15

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 115,290, and the molecular weight distribution index is approximately 1.44.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 250,000 are used.

(2) Measurement of the Molecular Weight of Example 16

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 106,202, and the molecular weight distribution index is approximately 1.52.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 250,000 are used.

(3) Measurement of the Molecular Weight of Example 17

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 91,235, and the molecular weight distribution index is approximately 1.62.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 250,000 are used.

(4) Measurement of the Molecular Weight of Example 18

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 80,012, and the molecular weight distribution index is approximately 1.51.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 250,000 are used.

(5) Measurement of the Molecular Weight of Example 19

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 103,587, and the molecular weight distribution index is approximately 1.48.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 250,000 are used.

(6) Measurement of the Molecular Weight of Example 20

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 66,702, and the molecular weight distribution index is approximately 1.60.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 250,000 are used.

(7) Measurement of the Molecular Weight of Example 21

7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 89,402, and the molecular weight distribution index is approximately 1.49.

Test conditions: The column temperature is 40° C. The eluent is tetrahydrofuran. The flow rate is 0.6 ml/min. The detector is a RID-10A detector. Calibration: four different standardized polystyrene having molecular weight ranging between 2,000 and 250,000 are used.

Comparative Example 4

25.9 g lactide (0.18 mol) and zinc nitrate hexahydrate (29.7 mg, 0.1 mmol) are added to Schlenk reaction tubes. The tubes are heated to 180° C. for 18 hours. Through the $^1$H NMR quantitative analysis, the conversion rate of lactide is 45.6%. 7.0 mg of PLA is taken and dissolved in 1 ml of tetrahydrofuran solution. The solution is filtered through a 0.4 μm pore size polytetrafluoroethylene filter membrane. 20 μl of the filtrate is taken and added to an LC-20AD GPC sampler produced by Shimadzu (Japan). The calculated weight average molecular weight is approximately 11,402, and the molecular weight distribution index is approximately 1.76.

Comparative Example 5

25.9 g lactide (0.18 mol) and sodium molybdate dihydrate (0.3 mmol) are added to Schlenk reaction tubes. The tubes are heated to 180° C. for 18 hours. Through the $^1$H NMR quantitative analysis, the conversion rate of lactide is very low. The monomer conversion rate is 5%, the calculated weight average molecular weight is smaller than 630, and the molecular weight distribution index is approximately 1.09.

Comparative Example 6

25.9 g lactide (0.18 mol) and 0.8 mg 1,2,4-triazole (0.6 mmol) are added to Schlenk reaction tubes. The tubes are heated to 180° C. for 18 hours. Through the $^1$H NMR quantitative analysis, there is no conversion of lactide, and no product of PLA is obtained.

The present invention provides a polyoxymolybdic acid coordination polymer catalyst. The catalyst is capable of diverse structural changes and has low cytotoxicity. The catalyst has high stability and strong catalytic activity towards lactide. This catalyst will support the development of the versatile, low toxicity and stable ring-opening polymerization of lactide.

The present invention provides an isopoly-molybdic acid coordination polymer and method of manufacturing the same. It relates to the field of catalysts for polylactic acid. A chemical formula of the isopoly-molybdic acid coordination polymer is $[Mo_2O_4(\mu_2\text{-}OH)_2(Htrz)]$. Htrz is a 1,2,4-triazole ligand, $(Mo_2O_4)^{2+}$ is a binuclear isopoly-molybdic radical cation. $(\mu_2\text{-}OH)$ is the bridging hydroxyl group. Sodium molybdate dihydrate and zinc nitrate hexahydrate undergo hydrothermal reaction in a closed condition to obtain the isopoly-molybdic acid coordination polymer that has a secondary layered structure. The synthesis of the isopoly-molybdic acid coordination polymer is simple with high yield and reproducibility. The isopoly-molybdic acid coordination polymer shows high catalytic activity towards the bulk ring-opening polymerization of lactide. The resulting polylactic acid has a weight average molecular weight exceeding 110,000. The polylactic acid has great potential in the fields of medical, degradable and packaging materials.

It should be noted that the above-mentioned embodiments are only for illustrating the technical solutions of the present invention and not for limiting, and although the present invention has been described in detail with reference to the further embodiments, it should be understood by those skilled in the art that modifications or equivalent substitutions may be made on the technical solutions of the present invention without departing from the spirit and scope of the technical solutions of the present invention, which should be covered by the claims of the present invention.

As used herein, terms "approximately", "basically", "substantially", and "about" are used for describing and explaining a small variation. When being used in combination with an event or circumstance, the term may refer to a case in which the event or circumstance occurs precisely, and a case in which the event or circumstance occurs approximately. As used herein with respect to a given value or range, the term "about" generally means in the range of ±10%, ±5%, ±1%, or ±0.5% of the given value or range. The range may be indicated herein as from one endpoint to another endpoint or between two endpoints. Unless otherwise specified, all the ranges disclosed in the present disclosure include endpoints. The term "substantially coplanar" may refer to two surfaces within a few micrometers (μm) positioned along the same plane, for example, within 10 μm, within 5 μm, within 1 μm, or within 0.5 μm located along the same plane. When reference is made to "substantially" the same numerical value or characteristic, the term may refer to a value within ±10%, ±5%, ±1%, or ±0.5% of the average of the values.

The invention claimed is:

1. An isopoly-molybdic acid coordination polymer catalyst for catalyzing a ring opening polymerization of lactide, wherein the isopoly-molybdic acid coordination polymer catalyst has a chemical formula of $[Mo_2O_4(\mu_2\text{-}OH)_2(Htrz)]$, Htrz is a 1,2,4-triazole ligand, $(Mo_2O_4)^{2+}$ is a binuclear isopoly-molybdate cation, and $(\mu_2\text{-}OH)$ is a bridging hydroxyl group.

2. The isopoly-molybdic acid coordination polymer catalyst of claim 1, wherein the isopoly-molybdic acid coordination polymer catalyst comprises a secondary structural unit, the secondary structural unit is orthorhombic system in the crystal structure and Pbcm in space group, the secondary structural unit has a molecular formula of $C_2H_5Mo_2N_3O_6$ and the molecular weight is 358.99, cell parameters of the secondary structural unit are a=3.9325(7) Å, b=13.844(3)Å, c=13.360(2) Å, α=90°, β=90°, γ=90°, and the cell volume is 727.3(2) Å$^3$, z=4, a basic structure of the secondary structural unit is a two-dimensional layered structure coordinated by $[Mo_2O_4]^{2+}$, 1,2,4-triazole ligand and $(\mu_2\text{-}OH)$.

3. A method of manufacturing the isopoly-molybdic acid coordination polymer catalyst of claim 1 comprising:
 adding a composition comprising sodium molybdate dihydrate, 1,2,4-triazole, zinc nitrate hexahydrate and deionized water to an autoclave;
 effecting a reaction to the composition at a temperature between 160 and 190° C. for a period between 48 and 96 hours;
 cooling the composition to a room temperature to obtain a crystal of the isopoly-molybdic acid coordination polymer;
 rinsing the crystal of the isopoly-molybdic acid coordination polymer by deionized water and then ethanol; and
 drying the crystal of the isopoly-molybdic acid coordination polymer to obtain the isopoly-molybdic acid coordination polymer.

4. The method of claim 3, wherein the mass ratio between the zinc nitrate hexahydrate and the sodium molybdate dihydrate is between 1:1 and 1:5.

5. The method of claim 3, wherein the mass ratio between the zinc nitrate hexahydrate and the 1,2,4-triazole is between 1:4 and 1:8.

6. The method of claim 3, wherein the mass ratio between sodium molybdate dihydrate and 1,2,4-triazole is between 1:1 and 1:5.

7. The method of claim 3, wherein every 3 to 9 ml of water is added to every 0.6 mmol of 1,2,4-triazole.

8. An application of the isopoly-molybdic acid coordination polymer catalyst of claim 1 for catalyzing the ring opening polymerization of lactide in the manufacturing of polylactic acid comprising:

adding isopoly-molybdic acid coordination polymer catalyst and lactide into a dry Schlenk reaction tube to effect a bulk ring opening polymerization under a reaction temperature and obtain polylactic acid, wherein the reaction temperature ranges between 150 and 190° C., and a reaction time ranges between 6 and 24 hours.

9. The application of claim 8, wherein the molar ratio between the isopoly-molybdic acid coordination polymer and lactide is between 1:5000 and 1:30000.

10. The application of claim 8, wherein the weight average molecular weight of polylactic acid is between 70000 and 120000, and the molecular weight distribution index is between 1.3 and 1.8.

* * * * *